United States Patent
Ke

(10) Patent No.: US 10,177,649 B1
(45) Date of Patent: Jan. 8, 2019

(54) POWER CONVERSION APPARATUS AND SYNCHRONOUS RECTIFICATION CIRCUIT THEREOF

(71) Applicant: Power Forest Technology Corporation, Hsinchu County (TW)

(72) Inventor: Po-Jen Ke, Taoyuan (TW)

(73) Assignee: Power Forest Technology Corporation, Hsinchu County (TW)

( * ) Notice: Subject to any disclaimer, the term of this patent is extended or adjusted under 35 U.S.C. 154(b) by 0 days.

(21) Appl. No.: 15/694,875

(22) Filed: Sep. 4, 2017

(30) Foreign Application Priority Data

Jul. 5, 2017 (TW) .............................. 106122471 A

(51) Int. Cl.
*H02M 1/32* (2007.01)
*H02M 3/335* (2006.01)

(52) U.S. Cl.
CPC ......... *H02M 1/32* (2013.01); *H02M 3/33592* (2013.01); *H02M 2001/327* (2013.01)

(58) Field of Classification Search
CPC ............... H02M 3/33592; H02M 1/32; H02M 3/33576; H02M 3/33569; H02M 2001/32; H02M 2001/327
See application file for complete search history.

(56) References Cited

U.S. PATENT DOCUMENTS

| | | | |
|---|---|---|---|
| 2013/0194836 A1* | 8/2013 | Morris | H02M 1/32 363/21.14 |
| 2016/0036340 A1* | 2/2016 | Kikuchi | H02M 1/32 363/21.14 |
| 2016/0072399 A1* | 3/2016 | Kikuchi | H02M 3/33592 363/21.14 |
| 2016/0261200 A1* | 9/2016 | Yabuzaki | H02M 1/32 |
| 2017/0229973 A1* | 8/2017 | Ke | H02M 3/33592 |
| 2017/0365994 A1* | 12/2017 | Kikuchi | H05B 37/0227 |

FOREIGN PATENT DOCUMENTS

| | | |
|---|---|---|
| TW | 578353 | 3/2004 |
| TW | I389435 | 3/2013 |
| TW | I536706 | 6/2016 |

\* cited by examiner

*Primary Examiner* — Kyle J Moody
(74) *Attorney, Agent, or Firm* — JCIPRNET

(57) ABSTRACT

A power conversion apparatus and a synchronous rectification (SR) circuit thereof are provided. The power conversion apparatus includes a transformer and the SR circuit. A primary winding of the transformer receives an input voltage. A secondary winding of the transformer provides an output voltage to an output terminal. The SR circuit includes a SR transistor and a SR controller. The SR transistor is coupled between the secondary winding and the output terminal and controlled by a control signal. The SR controller is coupled to the SR transistor to receive a first detecting signal, and generates the control signal according to the first detecting signal. When the SR controller detects that the SR circuit is abnormal, the SR controller generates the controller signal to keep the SR transistor at an on state so as to perform an abnormal protection on the SR circuit.

8 Claims, 1 Drawing Sheet

POWER CONVERSION APPARATUS AND SYNCHRONOUS RECTIFICATION CIRCUIT THEREOF

CROSS-REFERENCE TO RELATED APPLICATION

This application claims the priority benefit of Taiwan application serial no. 106122471, filed on Jul. 5, 2017. The entirety of the above-mentioned patent application is hereby incorporated by reference herein and made a part of this specification.

BACKGROUND OF THE INVENTION

Field of the Invention

The invention is related to a power apparatus, and particularly to a power conversion apparatus having an abnormal protection mechanism for a secondary side of the power conversion apparatus and a synchronous rectification circuit thereof.

Description of Related Art

A power conversion apparatus is an essential component of modern electronic devices. In a power conversion apparatus which uses pulse width modulation (PWM) for control, a secondary side of the power conversion apparatus has a rectifying diode in general. Since the rectifying diode has greater power consumption in an on state, a synchronous rectification transistor which has lower on-resistance may be used to as a substitute for the rectifying diode. In such configuration, a synchronous rectification controller is also required to control on and off of the secondary synchronous rectification transistor.

When the secondary side of the power conversion apparatus is abnormal, for example, the temperature of the synchronous rectification transistor is too high, but not limited thereto, a conventional solution is to use the synchronous rectification controller to turn off the synchronous rectification transistor so as to prevent the temperature of the synchronous rectification transistor from rising continuously. However, since there is a parasitic diode between a drain terminal and a body terminal of the synchronous rectification transistor, in the condition that the secondary side is in an over-temperature condition and the synchronous rectification transistor is off, when the energy stored in a primary side of the power conversion apparatus is transferred to the secondary side, the parasitic diode in the synchronous rectification transistor would be turned on, and thus the current of the secondary side flows through the parasitic diode of the synchronous rectification transistor. Given that the parasitic diode has greater power consumption in the on state than the power consumption of the synchronous rectification transistor in the on state, in which case, the temperature of the synchronous rectification transistor rises dramatically instead, and the effect of abnormal protection cannot be achieved.

SUMMARY OF THE INVENTION

Accordingly, the invention provides a power conversion apparatus and a synchronous rectification circuit thereof. When the synchronous rectification circuit is abnormal, a synchronous rectification transistor in the synchronous rectification circuit can be maintained in an on state so as to perform abnormal protection on the synchronous rectification circuit.

In the invention, the power conversion apparatus includes a transformer and a synchronous rectification circuit. The transformer has a primary winding and a secondary winding, wherein the primary winding receives an input voltage, and the secondary winding provides an output voltage to an output terminal. In addition, the synchronous rectification circuit of the invention includes a synchronous rectification transistor and a synchronous rectification controller. The synchronous rectification transistor is coupled between the secondary winding and the output terminal, and is controlled by a control signal. The synchronous rectification controller is coupled to the synchronous rectification transistor to receive a first detecting signal, and generates the control signal according to the first detecting signal so as to turn on/off of the synchronous rectification transistor. When the synchronous rectification controller detects that the synchronous rectification circuit is abnormal, the synchronous rectification controller generates the control signal to keep the synchronous rectification transistor in an on state so as to perform an abnormal protection on the synchronous rectification circuit.

In one embodiment of the invention, when the synchronous rectification controller detects that the synchronous rectification circuit is abnormal, the transformer is short-circuited in response to that the synchronous rectification transistor is kept in the on state, such that the power conversion apparatus activates a short circuit protection mechanism and thereby performs the abnormal protection on the synchronous rectification circuit.

In one embodiment of the invention, the power conversion apparatus further includes a power switch and a pulse width modulation (PWM) signal generator. The power switch is coupled to the primary winding, and controlled by a PWM signal. The PWM signal generator is coupled to the power switch, and generates and adjusts the PWM signal according to the state of the output terminal. The PWM signal generator further detects the current of the primary winding so as to acquire a second detecting signal. When the synchronous rectification controller detects that the synchronous rectification circuit is abnormal, the PWM signal generator detects that the transformer is short-circuited according to the second detecting signal in response to that the synchronous rectification transistor is kept in the on state, such that the PWM signal generator generates the PWM signal to switch off the power switch and thereby performs the abnormal protection on the synchronous rectification circuit.

In one embodiment of the invention, when the synchronous rectification controller detects that the synchronous rectification circuit is abnormal, the synchronous rectification controller does not output an anomaly indication signal to the PWM signal generator.

In one embodiment of the invention, the abnormal event is an over-temperature event.

In one embodiment of the invention, the synchronous rectification controller includes an anomaly detecting circuit and a control circuit. The anomaly detecting circuit receives an external detection signal, and determines whether the synchronous rectification circuit is abnormal according to the external detection signal to generate a determination result. The control circuit is coupled to the anomaly detecting circuit to receive the determination result. When it is determined that the synchronous rectification circuit is abnormal, the control circuit generates the control signal so as to set and keep the synchronous rectification transistor in the on state.

In summary, in the power conversion apparatus and the synchronous rectification circuit thereof provided by the embodiment of the invention, when the synchronous rectification controller detects that the synchronous rectification circuit is abnormal, the synchronous rectification controller sets and keeps the synchronous rectification transistor in the on state, and thus the transformer becomes short-circuited such that the PWM signal generator switches off the power switch accordingly, thereby achieving the purpose of performing abnormal protection on the synchronous rectification circuit.

In order to make the aforementioned features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
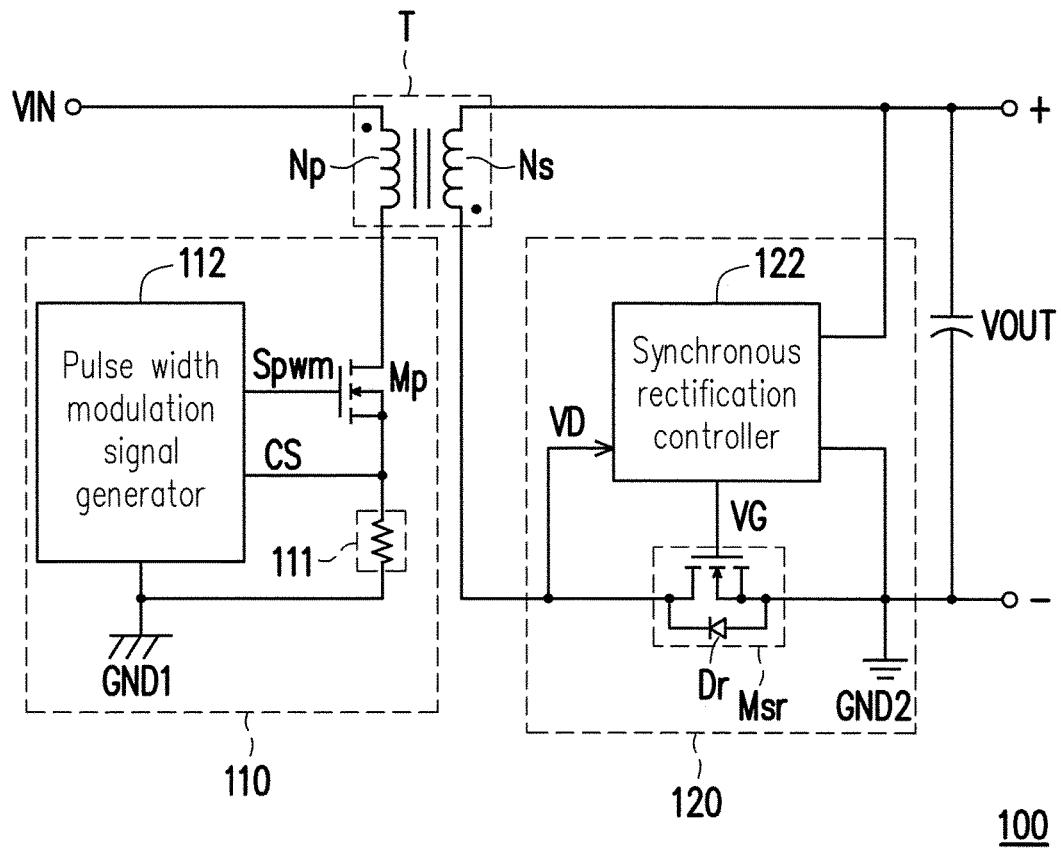
FIG. 1 is a schematic circuit diagram of a power conversion apparatus according to one embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic circuit diagram of a power conversion apparatus according to one embodiment of the invention. Referring to FIG. 1, the power conversion apparatus 100 may include a primary power control circuit 110, a transformer T and a synchronous rectification circuit 120. The transformer T includes a primary winding Np and a secondary winding Ns. A first terminal (e.g., a common-polarity terminal, which is dotted) of the primary winding Np receives an input voltage VIN, and a first terminal (e.g., opposite-polarity terminal, which is not dotted) of the secondary winding Ns provides an output voltage VOUT to an output terminal so as to supply power to a load (not shown) coupled to the output terminal, which should not be construed as a limitation to the invention.

The synchronous rectification circuit 120 may include a synchronous rectification transistor Msr and a synchronous rectification controller 122. A drain terminal of the synchronous rectification transistor Msr is coupled to a second terminal (e.g., a common-polarity terminal) of the secondary winding Ns. A source terminal and a body terminal of the synchronous rectification transistor Msr are coupled to a second ground terminal GND2, wherein there is a parasitic rectifying diode Dr between the drain terminal and the body terminal of the synchronous rectification transistor Msr. The synchronous rectification controller 122 may receive the output voltage VOUT to serve as the power required for the operation of the synchronous rectification controller 122, which should not be construed as a limitation to the invention. The synchronous rectification controller 122 is coupled to the synchronous rectification transistor Msr, and receives a signal from the drain terminal of the synchronous rectification transistor Msr to serve as a first detecting signal VD. The synchronous rectification controller 122 may generate a control signal VG according to the first detecting signal VD so as to turn on/off the synchronous rectification transistor Msr. Particularly, when the synchronous rectification controller 122 detects that the synchronous rectification circuit 120 is abnormal, the synchronous rectification controller 122 may generate the controller signal VG so as to keep the synchronous rectification transistor Msr in the on state to perform abnormal protection on the synchronous rectification circuit 120. More detailed descriptions in this regard will be incorporated in the following paragraphs.

On the other hand, the primary power control circuit 110 may include a power switch Mp, a current sensing circuit 111 and a PWM signal generator 112, but the invention provides no limitation thereto. In other embodiments of the invention, the current sensing circuit 111 may be integrated in the PWM signal generator 112. The first terminal of the power switch Mp is coupled to the second terminal (e.g., an opposite-polarity terminal) of the primary winding Np. The control terminal of the power switch Mp receives the PWM signal Spwm. The second terminal of the power switch Mp is coupled to the first terminal of the current sensing circuit 111 and the PWM signal generator 112. The second terminal of the current sensing circuit 111 is coupled to a first ground terminal GND1. The PWM signal generator 112 is coupled to the control terminal of the power switch Mp to generate and adjust the PWM signal Spwm according to the state (or power supply requirement) of the load coupled to the output terminal. In addition, the PWM signal generator 112 may detect the current flowing through the primary winding Np via the current sensing circuit 111 to serve as a second detecting signal CS. In one embodiment of the invention, the current sensing circuit 111 may be implemented using a resistor, and the PWM signal generator 112 may be implemented using an existing PWM signal generating circuit.

In one embodiment of the invention, when the synchronous rectification controller 122 detects that the synchronous rectification circuit 120 is abnormal, the transformer T is short-circuited in response to that the synchronous rectification transistor Msr is kept in the on state, such that the power conversion apparatus 100 activates a short circuit protection mechanism and thereby achieves the purpose of performing abnormal protection on the synchronous rectification circuit 120.

Furthermore, when the synchronous rectification controller 122 detects that the synchronous rectification circuit 120 is abnormal (e.g., the synchronous rectification circuit 120 is in an over-temperature state, which should not be construed as a limitation to the invention), the synchronous rectification controller 122 may set and keep the synchronous rectification transistor Msr in the on state (at this point, the parasitic rectification diode Dr may be regarded as being short-circuited); accordingly, when the power switch Mp is turned on in response to the PWM signal Spwm, given that the synchronous rectification transistor Msr is also in the on state, the transformer T is thus short-circuited. At this point, the current of the primary winding Np rises dramatically such that a voltage value of the second detecting signal CS is greater than a threshold value. Therefore, the PWM signal generator 112 may determine that the transformer T is short-circuited (i.e, the parasitic rectifying diode Dr is short-circuited) according to the voltage value of the second detecting signal CS, so that the PWM signal generator 112 can perform a secondary rectifier short protection (SRSP) by switching off the power switch Mp via the PWM signal Spwm so as to shut down the power conversion apparatus 100. In this manner, the purpose of performing abnormal protection on the synchronous rectification circuit 120 can be achieved.

Briefly, when the synchronous rectification controller 122 detects that the synchronous rectification circuit 120 is abnormal, the synchronous rectification controller 122 sets and keeps the synchronous rectification transistor Msr in the on state such that the transformer T becomes short-circuited and thus the PWM signal generator 112 switches off the power switch Mp. Therefore, the power switch Mp could be switched off to shut down the power conversion apparatus 100 so as to achieve the purpose of performing the abnormal protection on the synchronous rectification circuit 120 without using an additional pin of the synchronous rectification controller 122 to output the anomaly indication signal to inform the PWM signal generator 112 (e.g., via an isolation circuit such as an optical coupler). With such design, the number of pin for the synchronous rectification controller 122 and the number of required isolation circuit can also be reduced so as to lower the cost of the whole hardware circuit.

In one embodiment of the invention, the synchronous rectification controller 122 may be implemented using a micro-controller, which should not be construed as a limitation to the invention. In other embodiments of the invention, the synchronous rectification controller 122 may be implemented using a hardware circuit such as an application-specific integrated circuit (ASIC) or a programmable logic device (PLD) such as a complex programmable logic device (CPLD) or a field-programmable gate array (FPGA).

In one embodiment of the invention, the synchronous rectification controller 122 may include a built-in temperature sensing circuit (not shown) which can sense the temperature of the synchronous rectification controller 122 so as to generate a temperature sensing result. The synchronous rectification controller 122 can determine whether the synchronous rectification circuit 120 is in the over-temperature state according to the temperature sensing result. When the synchronous rectification controller 122 itself determines that it is in the over-temperature state, the synchronous rectification controller 122 may generate the control signal VG to set and keep the synchronous rectification transistor Msr in the on state.

Figure 2:
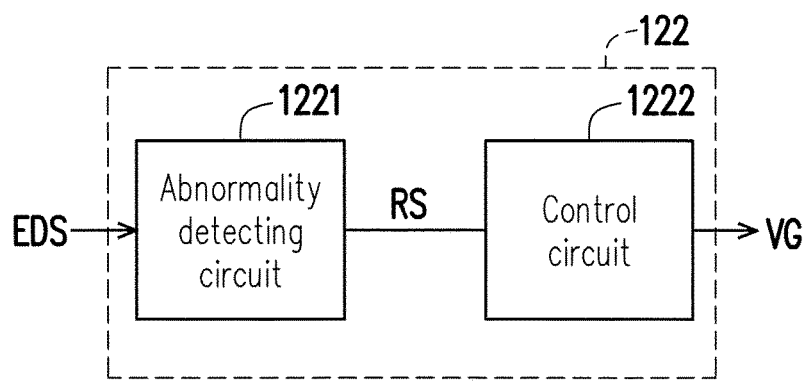
FIG. 2 is a circuit block diagram of a synchronous rectification controller according to one embodiment of the invention.

Referring to FIGS. 1 and 2 together, FIG. 2 is a circuit block diagram of the synchronous rectification controller 122 according to one embodiment of the invention. The synchronous rectification controller 122 includes an anomaly detecting circuit 1221 and a control circuit 1222. The anomaly detecting circuit 1221 may receive an external detecting signal EDS provided by an external detection auxiliary circuit (not shown) and determine whether the synchronous rectification circuit 122 is abnormal according to the external detecting signal EDS (but the invention is not limited thereto) so as to generate a determination result RS accordingly. The external detecting signal EDS may be a detection result of at least one of an output voltage VOUT, an output current of the power conversion apparatus 100 and the temperature of the synchronous rectification circuit 120, which should not be construed as a limitation to the invention. The control circuit 1222 is coupled to the anomaly detecting circuit 1221 to receive the determination result RS. When the determination result RS indicates that the synchronous rectification circuit 120 (illustrated in FIG. 1) is abnormal, the control circuit 1222 may generate the control signal VG to set and keep the synchronous rectification transistor Msr (illustrated in FIG. 1) in the on state.

In one embodiment of the invention, the anomaly detecting circuit 1221 may be an existing anomaly detecting circuit such as an over-temperature detecting circuit, an over-voltage detecting circuit, an over-current detecting circuit or an output short-circuit detecting circuit and so on, which should not be construed as a limitation to the invention. In one embodiment of the invention, the control circuit 1222 may be realized as a micro-controller, which should not be construed as a limitation to the invention.

In summary, in the power conversion apparatus and the synchronous rectification circuit thereof provided by the embodiment of the invention, when the synchronous rectification controller detects that the synchronous rectification circuit is abnormal, the synchronous rectification controller sets and keeps the synchronous rectification transistor in the on state, and thus the transformer becomes short-circuited such that the PWM signal generator switches off the power switch, thereby achieving the purpose of performing abnormal protection on the synchronous rectification circuit.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:
1. A power conversion apparatus, comprising:
a transformer, comprising a primary winding and a secondary winding, wherein the primary winding receives an input voltage, and the secondary winding provides an output voltage to an output terminal; and
a synchronous rectification circuit, comprising:
a synchronous rectification transistor, coupled between the secondary winding and the output terminal and controlled by a control signal; and
a synchronous rectification controller, coupled to the synchronous rectification transistor to receive a first detecting signal, and generating the control signal according to the first detecting signal so as to turn on/off the synchronous rectification transistor,
wherein when the synchronous rectification controller detects that an abnormal event occurs on the synchronous rectification circuit, the synchronous rectification controller generates the control signal to keep the synchronous rectification transistor in an on state so as to perform abnormal protection on the synchronous rectification circuit,
wherein the synchronous rectification controller comprises:
an anomaly detecting circuit, receiving an external detecting signal, and determines whether the synchronous rectification circuit is abnormal according to the external detecting signal so as to generate a determination result accordingly; and
a control circuit, coupled to the anomaly detecting circuit to receive the determination result, wherein when the determination result is that the synchronous rectification circuit is abnormal, the control circuit generates the control signal so as to set and keep the synchronous rectification transistor in the on state.
2. The power conversion apparatus according to claim 1, wherein when the synchronous rectification controller detects that the abnormal event occurs on the synchronous rectification circuit, the transformer becomes short-circuited in response to that the synchronous rectification transistor is kept in the on state, such that the power conversion apparatus activates a short circuit protection mechanism and thereby performs abnormal protection on the synchronous rectification circuit.

3. The power conversion apparatus according to claim 1, further comprising:

a power switch, coupled to the primary winding, and controlled by a pulse width modulation (PWM) signal; and a PWM signal generator, coupled to the power switch, and generating and adjusting the PWM signal according to a state of the output terminal, wherein the PWM signal generator further detects a current of the primary winding so as to acquire a second detecting signal, wherein when the synchronous rectification controller detects that the abnormal event occurs on the synchronous rectification circuit, the PWM signal generator detects that the transformer is short-circuited according to the second detecting signal in response to that the synchronous rectification transistor is kept in the on state, such that the PWM signal generator generates the PWM signal to switch off the power switch and thereby performs abnormal protection on the synchronous rectification circuit.

4. The power conversion apparatus according to claim 3, wherein, when the synchronous rectification controller detects that the abnormal event occurs on the synchronous rectification circuit, the synchronous rectification controller does not output an anomaly indication signal to the PWM signal generator.

5. The power conversion apparatus according to claim 1, wherein the abnormal event is an over-temperature event.

6. A synchronous rectification circuit, for use in a power conversion apparatus, and comprising:

a synchronous rectification transistor, coupled between a secondary winding of a transformer of the power conversion apparatus and an output terminal of the power conversion apparatus, and controlled by a control signal; and a synchronous rectification controller, coupled to the synchronous rectification transistor to receive a first detecting signal, and generating the control signal according to the first detecting signal so as to turn on/off the synchronous rectification transistor, wherein when the synchronous rectification controller detects that an abnormal event occurs on the synchronous rectification circuit, the synchronous rectification controller generates the control signal so as to keep the synchronous rectification transistor in an on state, thereby performing an abnormal protection on the synchronous rectification circuit, wherein the synchronous rectification controller comprises:

an anomaly detecting circuit, receiving an external detecting signal, and determines whether the synchronous rectification circuit is abnormal according to the external detecting signal so as to generate a determination result accordingly; and a control circuit, coupled to the anomaly detecting circuit so as to receive the determination result, wherein when the determination result is that the synchronous rectification circuit is abnormal, the control circuit generates the control signal so as to set and keep the synchronous rectification transistor in the on state.

7. The synchronous rectification circuit according to claim 6, wherein when the synchronous rectification controller detects that the abnormal event occurs on the synchronous rectification circuit, the transformer becomes short-circuited in response to that the synchronous rectification transistor is kept in the on state, such that the power conversion apparatus activates a short circuit protection mechanism and thereby performs abnormal protection on the synchronous rectification circuit.

8. The synchronous rectification circuit according to claim 6, wherein the abnormal event is an over-temperature event.

* * * * *